United States Patent

Doscher

[15] 3,691,283
[45] Sept. 12, 1972

[54] METHOD FOR THE CONTROL OF HELMINTHS IN WARM-BLOODED ANIMALS USING BIS-N-PHOSPHORYLATED COMPOUNDS

[72] Inventor: Mary Ehlers Doscher, Trenton, N.J. 08690

[73] Assignee: American Cyanamid Company, Stamford, Conn.

[22] Filed: April 15, 1971

[21] Appl. No.: 134,453

[52] U.S. Cl. ................................424/204
[51] Int. Cl. ............................A61k 27/00
[58] Field of Search.........................424/204

[56] References Cited

UNITED STATES PATENTS 2,907,775   10/1959   Danbar.....................260/926
3,095,438   6/1963    Kauer......................424/204

*Primary Examiner*—Sam Rosen
*Attorney*—Stephen Raines

[57] ABSTRACT

The present invention relates to a novel method of controlling helminths in warm-blooded animals and involves administering to said animals an anthelmintically effective amount of a bis-N-phosphorylated compound represented by the structure:

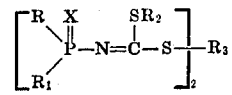

wherein R and $R_1$ each represent members selected from the group consisting of loweralkyl, loweralkoxy and phenyl; X is sulfur or oxygen; $R_2$ is loweralkyl, loweralkenyl, benzyl or halo-substituted benzyl; and $R_3$ is a loweralkylene radical, such as methylene, ethylene, loweralkyl substituted ethylene, trimethylene, loweralkyl substituted trimethylene, oxydimethylene, tetramethylene or loweralkyl substituted tetramethylene.

10 Claims, No Drawings

METHOD FOR THE CONTROL OF HELMINTHS IN WARM-BLOODED ANIMALS USING BIS-N-PHOSPHORYLATED COMPOUNDS

DETAILED DESCRIPTION OF THE INVENTION

The compounds utilized in the practice of the process of the present invention are described in U.S. Pat. application Ser. No. 58,676, filed July 27, 1970, which is a continuation-in-part application of U.S. Pat. application Ser. No. 640,836, filed May 24, 1967, now abandoned.

U.S. Pat. application Ser. No. 58,676, filed July 27, 1970 reports the compounds utilized in the present invention to be useful for the control of insects and arachnids. The compounds were found to be effective when applied as either contact or systemic insecticides or arachnicides but it was never suggested or indicated that the compounds could or even might be used as anthelmintic agents for treating helminthiasis in warm-blooded animals.

In general, the compounds which are effective in practicing the process of the present invention, involving treatment of warm-blooded animals with bis-N-phosphorylated compounds to control helminthiasis in such animals, have the formula:

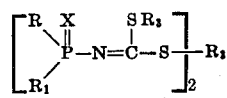

wherein R and $R_1$ are members selected from the group consisting of loweralkyl $C_1$–$C_4$, loweralkoxy $C_1$–$C_4$, and phenyl; X is sulfur or oxygen; $R_2$ is loweralkyl $C_1$–$C_4$, benzyl or halo-substituted benzyl; and $R_3$ is methylene, ethylene, loweralkyl substituted ethylene, trimethylene, loweralkyl substituted trimethylene, oxydimethylene, tetramethylene or loweralkyl substituted tetramethylene. These bis-N-phosphorylated compounds are generally prepared in two stages.

First, a phosphinyl isothiocyanate of the formula:

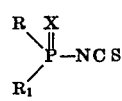

is reacted with the salt of an alkylene dithiol of the formula: M—S—$R_3$—S—M wherein M is an alkali metal, such as sodium, potassium, or lithium, or a trialkylammonium group to form an alkylene-bis-phosphinyldithiocarbamate salt. Upon acidification, the alkylene-bis-phosphinyldithiocarbamate thus formed is recovered. Approximately 2 moles of the isocyanate reactant are used per mole of the alkylene dithiol. However, the molar ratio may be varied somewhat without seriously altering product yield. Advantageously, the reaction can be carried out over a wide range of temperatures, usually between about 0° and 100° C., but is is preferred to conduct the reaction at a temperature between about 30° and 60° C. Graphically, the over-all reaction may be illustrated as follows:

(1) 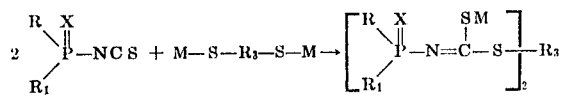

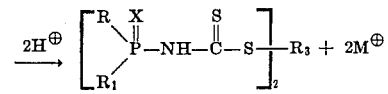

wherein R, $R_1$, $R_3$, X and M are as hereinabove defined.

Illustrative of the alkylene-bis-phosphinyldithiocarbamates so prepared are: ethylene-bis-diethoxyphosphinyldithiocarbamate, methylene-bis-dimethoxyphosphinyldithiocarbamate, propylene-bis-diethylphosphinyldithiocarbamate, and tetramethylene-bis-dibutoxyphosphinyldithiocarbamate.

Alkali metal or other salts, such as the trialkylammonium salt, of the above-identified alkylene-bis-phosphinyldithiocarbamates are alkylated or otherwise reacted in accordance with the following over-all reaction:

(2) 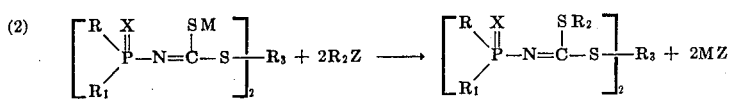

wherein R, $R_1$, $R_3$, X and M are as previously defined; $R_2$ is loweralkyl, loweralkenyl, such as allyl or methallyl, benzyl or halo-substituted benzyl (such as 4-iodobenzyl, 2,4-dichlorobenzyl, and 3,4,5-tribromobenzyl); and Z is a halogen or a p-toluenesulfonate group to form the corresponding alkylene-bis-phosphinylimidodithiocarbonates. The reaction is preferably carried out at about a one to two mole ratio of the alkylene-bis-phosphinyldithiocarbamate salt to alkyl halide, respectively.

Typical of the alkylene-bis-phosphinylimidodithiocarbonates of the present invention which may be prepared are: S,S'-ethylene-S,S'-dibenzyl-diethoxyphosphinylimidodithiocarbonate, S, S'-ethylene-S,S'-dimethyl-diethoxyphosphinylimidodithiocarbonate, S, S'-tetramethylene-S,S'-dibutylmethylethoxyphosphinylimidodithiocarbonate, S, S'-ethylene-S,S'-di-2,4-dichlorobenzyl-diethoxyphosphinylimidodithiocarbonate, and S,S'-ethylene-S,S'-dimethyl-diethoxyphosphinylimidodithiocarbonate.

An alternative method of preparing the compounds of the present invention is to treat the phosphinyl isothiocyanates of the formula:

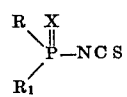

with an alkali metal hydrosulfide, MSH, yielding the corresponding phosphinyldithiocarbamate salt:

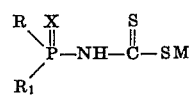

where R, $R_1$ and M are hereinabove defined. Where the latter salt is reacted with bis-chloromethyl ether and the reaction mixture acidified, there are formed oxydimethylene-bis-phosphinyldithiocarbamates of the formula:

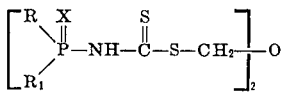

Illustrative of the oxydimethylene-bis-phosphinyldithiocarbamates so prepared are: oxydimethylene-bis-diethoxyphosphinyldithiocarbamate, oxydimethylene-bis-dimethoxyphosphinyldithiocarbamate, and oxydimethylene-bis-dimethylphosphinyldithiocarbamate.

When the latter reaction mixture is not acidified, but is further alkylated, as for example, with an alkyl halide: $R_2Z$ the oxydimethylene-bis-phosphinylimidodithiocarbonates are formed having the formula:

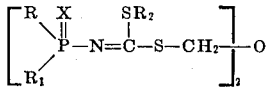

wherein R, $R_1$, $R_3$ and X are the same as defined above.

Typical of the oxydimethylene-bis-phosphinylimidodithiocarbonates formed are: S,S'-oxydimethylene-S,S'-dibenzyldiethoxyphosphinylimidodithiocarbonate, S,S'-oxydimethylene-S,S'-diethyl-diethylphosphinylimidodithiocarbonate, and S,S'-oxydimethylene-S,S'-di-2-chlorobenzyl-methoxyphenylphosphinylimidodithiocarbonate.

In general, to prepare compounds of the formula:

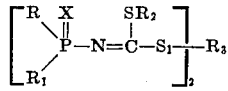

wherein $R_3$ is a methylene group, it is a good practice to react the above phosphinyldithiocarbamate salt first with an alkylating agent: $R_2Z$ wherein $R_2$ is as defined above and Z is a halogen atom, such as chlorine, bromine or iodine.

Suitable alkylating agents employed are: methyl iodide, ethyl bromide, allyl chloride, isopropyl iodide, methallyl bromide, butyl iodide, benzyl chloride, 4-bromobenzyl chloride, 4-chlorobenzyl chloride, and the like.

The alkylation step is followed by reaction with a methylene halide, such as methylene bromide or methyleneiodide to obtain the corresponding ethylene-bis-phosphinylimidodithiocarbonates as written graphically by the equations:

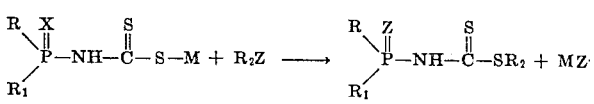

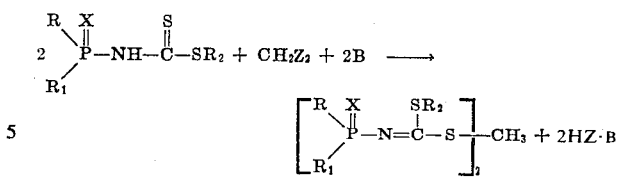

wherein B is a base, such as triethylamine, sodium carbonate or potassium hydroxide, and R, $R_1$, X and Z are the same as defined above.

In accordance with the present invention, bis-N-phosphorylated compounds, as described above, may be used for controlling helminths in a variety of warm-blooded animals including dogs, foxes, horses, cattle, sheep, swine, goats, rabbits, and the like.

Advantageously, these compounds may be given orally in the form of a capsule, pill, tablet, bolus, drench, liquid suspension or the like, or they may be administered by admixed with or incorporated in the feed. Where a single dose is to be given, it is usually most expedient to administer the drug in a capsule, pill, tablet, bolus, drench or liquid suspension. Generally between about 1.25 mg. and 30 mg. of drug per kg. of animal body weight, and preferably 2.5 mg. to 15 mg./kg., given as a dose, is satisfactory for removing helminths from most animals. Where multiple doses are used the drug is usually given in the feed (i.e., a nutritionally balanced diet) or drinking water at levels of from about 0.001 to about 1.0 percent and preferably 0.01 to 0.5 percent. Where oral administration would prove difficult, for example in the treatment of a sick animal, the compounds of the present invention may be given by injection, for example, subcutaneously or intramuscularly. Here the dosage levels would be similar to the levels already given for the single oral dose.

In addition, these compounds may be used in mixtures with other useful anthelmintic agents when administered to warm-blooded animals. The combinations may be administered by the numerous routes and methods given for administering the compounds as single entities. An example of one such useful combination which gives rise to a broader spectrum of activity, is m-aminotetramisole (imidazo[2,1-b]thiazole, 6-(m-aminophenyl)-2,3,5,6-tetrahydro-1-dihydrochloride) and a phosphate ester, such as imidocarbonic acid, (diethoxyphosphinyl)dithio-,S,S'-dibenzyl S,S'-trimethylene ester.

The invention will be further illustrated in conjunction with the following examples.

EXAMPLE 1

Preparation of Ethylene-bis-Diethoxyphosphinyldithiocarbamate

The sodium salt of ethanedithiol is obtained as a colorless solid by adding the dithiol to excess sodium methoxide in ethanol under nitrogen followed by addition thereof of benzene. It is washed with ethanol-benzene and then with ether and dried in vacuo. To a cooled (room temperature) mixture of 8.5 parts of diethoxyphosphinyl isothiocyanate in 100 parts (by volume) of benzene is added 3.0 parts of ethanedithiol sodium salt. After an hour, 10 parts (by volume) of the stirred mixture is removed and the very fine solids are spun down in the centrifuge and washed with one part of ether. The nuclear magnetic resonance spectrum in deuterium oxide shows a singlet at 6.80τ(—CH$_2$—S—, 4H), a multiplet at 5.9τ(—CH$_2$—O—, 8H), and a doublet at 8.68τ(CH$_3$—C, 12H).

The remainder of the reaction mixture is mixed with water and the phases are separated. The benzene phase is washed several times with water. The combined water fractions are filtered, washed once with ether, poured into a flask, ice-cooled, and acidified with 25 percent hydrochloric acid. The precipitated solids are washed several times with water and vacuum dried at 45° to 50° C. over potassium hydroxide leaving 8.7 parts (84 percent based on work-up of 90 percent of the intermediate salt) of pale yellow crystals, melting point 115° to 118° C. Recrystallization by dissolving 5.0 parts in ethanol with slight warming followed by dilution with two volumes of hexane and cooling to −20° C. gives 3.4 parts of very fine pale yellow crystals, melting point 120° to 125° C. at 1°/minute (dec.).

Analysis Calculated for $C_{12}H_{26}N_2O_6P_2S_4$: C, 29.74; H, 5.29; N, 5.78; P, 12.79; S, 26.47.

Found: C, 30.14; H, 5.13; N, 5.75; P, 12.65; S, 26.66.

The infrared spectrum shows strong maxima at 1,240, 1,280, 1,480, and 3,080 cm$^{-1}$, the latter two assignable to the

group. The nuclear magnetic resonance spectrum in deuterochloroform shows a doublet at 0.1τ($\nu$ = 8 ppm., CH$_3$—C, 12H).

Utilizing the same procedure employed above to prepare ethylene-bis-diethoxyphosphinyldithiocarbamate but with the indicated substitution of reactants, the following analogs are prepared.

A. Preparation of Trimethylene-bis-Diethoxyphosphinyldithiocarbamate

By substituting propane-1,3-dithiol for ethanedithiol, melting point 89° to 90° C.

Analysis Calculated for $C_{13}H_{28}N_2O_6P_2S_4$: C, 31.31; H, 5.66; N, 5.62; P, 12.42; S, 25.72.

Found: C, 31.29; H, 5.84; N, 5.79; P, 12.24; S, 25.48.

B. Preparation of Propylene-bis-Diethoxyphosphinyldithiocarbamate

By substituting propane-1,2-dithiol for ethanedithiol, melting p poing 105° to 115° C.

Analysis Calculated for $C_{13}H_{28}N_2O_6P_2S_4$: C, 31.31; H, 5.66; N, 5.62; P, 12.42; S, 25.72.

Found: C, 31.42; H, 5.80; N, 5.72; P, 12.64; S, 25.91.

C. Preparation of Ethylene-bis-Diethoxyphosphinothioyldithiocarbamate

By substituting potassium diethoxyphosphinothioyldithiocarbamate, melting point 105° to 110° C.

Analysis Calculated for $C_{12}H_{26}N_2O_4P_2S_6$: C, 27.89; H, 5.07; N, 5.42; P, 11.99; S, 37.24.

Found: C, 28.00; H, 5.27; N, 5.60; P, 11.78; S, 37.20.

D. Preparation of Trimethylene-bis-Diethylphosphinyldithiocarbamate

By substituting diethylphosphinyl isothiocyanate for diethoxyphosphinyl isothiocyanate, and trimethylenedithiol sodium slat for ethanedithiol sodium salt, trimethylene-bis-diethylphosphinyldithiocarbamate was obtained in good yield.

E. Preparation of 2,3-Butylene-bis-Ethoxyphenylphosphino-thioyldithiocarbamate

Substituting ethoxyphenylphosphinothioyl isothiocyanate for diethoxyphosphinyl isothiocyanate, and 2,3-butanedithiol sodium slat for ethanedithiol sodium slat resulted in the formation of 2,3-butylene-bis-ethoxyphenylphosphi othioyldithiocarbamate in good yield.

F. Preparation of Tetramethylene-bis-Diphenylphosphinyldithiocarbamate

By substituting diphenylphosphinyl isothiocyanate for diethoxyphosphinyl isothiocyanate, and tetramethylenedithiol sodium slat for ethanedithiol sodium salt, tetramethylene-bis-diphenylphosphinyldithiocarbamate was obtained in good yield.

EXAMPLE 2

Preparation of S,S'-Ethylene-S,S'-Dibenzyl-Diethoxyphosphinylimidodithiocarbonate To a mixture of 1.48 parts of ethanedithiol and 3.4 parts of triethylamine in 30 ml. of benzene is added, with cooling, 5.7 parts of diethoxyphosphinyl isothiocyanate. After an hour, this mixture is added to 5.7 parts of benzyl bromide in 25 parts by volume of toluene in several portions over a 10-minute period (mild temperature rise to 29° C.). After stirring overnight, the mixture is diluted with more benzene, washed (including dilute sodium hydroxide), and concentrated to give 10.7 parts of oil. Column chromatography on a total of 150 parts of silica gel yields, on sequential elution with 1:1 carbon tetrachloride:chloroform, chloroform and 2 to 10 percent methanol in chloroform, 4.5 parts (42 percent) crude product. Two recrystallizations from ether gives 2.0 parts of colorless crystalline product in two fractions, melting point 67.5° to 68.5° C. and 64° to 66° C.

Analysis Calculated for $C_{26}H_{38}N_2O_6P_2S_4$: C, 46.97; H, 5.76; N, 4.22; P, 9.32; S, 19.29.

Found: C, 46.92; H, 5.35; N, 4.37; P, 9.39; S, 19.43.

The infrared spectrum shows maxima at 1250 and 1540 cm$^{-1}$ attributable to the P=O and C=N functions, respectively.

By the same procedure used to prepare S,S'-ethylene-S,S'-dibenzyl diethoxyphosphinylimidodithiocarbonate but with the indicated substitution of reagents, the following analogs are prepared.

A. Preparation of S,S'-ethylene-S,S'-Dimethyl-Diethoxyphosphinylimidodithiocarbonate By substituting methyl iodide for benzyl bromide, melting point 61° to 63° C.

Analysis Calculated for $C_{14}H_{30}N_2O_6P_2S_4$: C, 32.79; H, 5.90; N, 5.47; P, 12.08; S, 25.03.

Found: C, 32.76; H, 6.10; N, 5.60; P, 11,87; S, 25.11.

B. Preparation of S,S'-Ethylene-S,S'-Diethyl-Diethoxyphosphinylimidodithiocarbonate By substituting ethyl bromide for benzyl bromide, melting point 27° to 28° C.

Analysis Calculated for $C_{16}H_{34}N_2O_6P_2S_4$: C, 35.54; H, 6.34; N, 5.18; P, 11.46; S, 23.72.

Found: C, 35.52; H, 6.46; N, 5.26; P, 11.40; S, 23.72.

C. Preparation of S,S'-Trimethylene-S,S'-Dimethyl-

Diethoxyphosphinylimidodithiocarbonate

By substituting methyl iodide for benzyl bromide and propane-1,3-dithiol for ethanedithiol, there is prepared the above oily compound analyzing as follows:

Analysis Calculated for $C_{15}H_{32}N_2O_6P_2S_4$: C, 34.21; H, 6.13; N, 5.32; P, 11.76; S, 24.36.

Found: C, 34.15; H, 6.13; N, 5.31; P, 11.64; S, 24.47.

Preparation of S,S'-Propylene-S,S'-Dimethyl-Diethoxyphosphinylimidodithiocarbonate By substituting methyl iodide for benzyl bromide and propane-1,2-dithiol for ethanedithiol, there is prepared an oil having the above analysis:

Analysis Calculated for $C_{15}H_{32}N_2O_6P_2S_4$: C, 34.21; H, 6.13; N, 5.32; P, 11.76; S, 24.36.

Found: C, 33.78; H, 5.93; N, 5.59; P, 11.60; S, 24.70.

E. Preparation of S,S'-Ethylene-S,S'-dimethyl-Diethoxyphosphinothioylimidodithiocarbonate By substituting methyl iodide for benzyl bromide and diethoxyphosphinothioyl isothiocyanate for diethoxyphosphinyl isothiocyanate, melting point 76° to 77° C.

Analysis Calculated for $C_{14}H_{30}N_2O_4P_2S_6$: C, 30.86; H, 5.55; N, 5.15; P, 11.37; S, 35.32.

Found: C, 30.65; H, 5.40; N, 5.13; P, 11.30; S, 35.30.

F. Preparation of S,S'-Ethylene-S,S'-di-4-Chlorobenzyldiethoxyphosphinylimidodithiocarbonate By substituting 4-chlorobenzyl iodide for benzyl bromide, the compound S,S'-ethylene-S,S'-di-4-chlorobenzyldiethoxyphosphinylimidodithiocarbonate was obtained, melting point 71.5° to 73.5° C.

Analysis Calculated for $C_{26}H_{36}Cl_2N_2O_6P_2S_4$: C, 42.56; H, 4.95; Cl, 9.66; N, 3.82; P, 8.44; S, 17.48.

Found: C, 42.73; H, 5.24; Cl, 9.92; N, 3.93; P, 8.23; S, 17.20.

G. Preparation of S,S'-Ethylene-S,S'-Dibenzyl-di-n-Propoxyphosphinylimidodithiocarbonate By substituting di-n-propoxyphosphinyl isothiocyanate for diethoxyphosphinyl isothiocyanate, the compound S,S'-ethylene-S,S'-dibenzyl-di-n-propoxyphosphinylimidodithiocarbonate was obtained as an oil.

Analysis Calculated for $C_{30}H_{46}N_2O_6P_2S_4$: C, 49.97; H, 6.43; N, 3.89; P, 8.59; S, 17.79.

Found: C, 50.18; H, 6.98; N, 3.86; P, 8.81; S, 17.51.

H. Preparation of S,S'-Ethylene-S,S'-Dibenzyl-di-i-Propoxyphosphinylimidodithiocarbonate By substituting di-i-propoxyphosphinyl isothiocyanate for diethoxyphosphinyl isothiocyanate, the compound S, S'-ethylene-S,S'-dibenzyl-di-i-propoxyphosphinylimidodithiocarbonate was obtained in good yield.

Analysis Calculated for $C_{30}H_{46}N_2O_6P_2S_4$: C, 49.97; H, 6.43; N, 3.89; P, 8.59; S, 17.79.

Found: C, 49.83; H, 6.51; N, 3.93; P, 8.08; S, 18.02.

I. Preparation of S,S'-Trimethylene-S,S'-Dibenzyl-Diethoxyphosphinylimidodithiocarbonate By substituting propane-1,3-dithiol for ethanediol, the compound S,S'-trimethylene-S,S'-dibenzyl-diethoxyphosphinylimidodithiocarbonate was obtained as an oil.

Analysis Calculated for $C_{27}H_{40}N_2O_6P_2S_4$: c, 47.77; H, 5.94; N, 4.13; P, 9.12; S, 18.89.

Found: C, 47.51; H, 6.04; N, 4.22; P, 9.26; S, 19.16.

J. Preparation of S,S'-Ethylene-S,S'-Dibenzyl-Diethoxyphosphinothioylimidodithiocarbonate By substituting diethoxyphosphinothioyl isothiocyanate for diethoxyphosphinyl isothiocyanate, the compound S,S'-ethylene-S,S'-dibenzyl-diethoxyphosphinothioylimidodithiocarbonate was obtained in good yield.

Analysis Calculated for $C_{26}H_{38}N_2O_4P_2S_6$: C, 44.81; H, 5.50; N, 4.02; P, 8.89; S, 27.61.

Found: C, 44.89; H. 5.68; N, 4.06; P, 8.75; S, 27.69.

K. Preparation of S,S'-Tetramethylene-S,S'-Dibenzyl-Diethoxyphosphinylimidodithiocarbonate By substituting butane-1,4-dithiol for ethanediol, the compound S,S'-tetramethylene-S,S'-dibenzyl-diethoxyphosphinylimidodithiocarbonate was obtained as an oil.

Analysis Calculated for $C_{28}H_{42}N_2O_6P_2S_4$: C, 48.54; H. 6.10; N, 4.04; P, 8.94; S, 18.51.

Found: C, 48.80; H, 5.74; N, 4.29; P, 8.64; S, 18.31.

L. Preparation of S,S'-2,2-Dimethyltrimethylene-S,S'-di-2,4-Dichlorobenzyl-Dimethylphosphinylimidodithiocarbonate Substituting neopentyldithiol for ethanediol, dimethylphosphinyl isothiocyanate for diethoxyphosphinyl isothiocyanate, and 2,4-dichlorobenzyl chloride for benzyl bromide, the compound S,S'-2,2-dimethyltrimethylene-S,S'-di-2,4-dichlorobenzyl-dimethylphosphinylimidodithiocarbonate was obtained in good yield.

M. Preparation of S,S'-Propylene-S,S'-di-4-Fluorobenzylethyloxyphosphinothi oylimidodithiocarbonate Substituting propane-1,2-dithiol for ethanediol, ethylethoxyphosphinothioyl isothiocyanate for diethoxyphosphinyl isothiocyanate, and 4-fluorobenzyl iodide for benzyl bromide, the compound S,S'-propylene-S,S'-di-4-fluorobenzylethylethoxyphosphinothioylimidodithiocarbonate was obtained.

N. Preparation of S,S'-Trimethylene-S,S'-di-2-Bromobenzylethoxyphenylphosphinylimidodithiocarbonate Substituting propane-1,3-dithiol for ethanediol, ethoxyphenylphosphinyl isothiocyanate for diethoxyphosphinyl isothiocyanate, and 2-bromobenzyl bromide for benzyl bromide, the compound S,S'-trimethylene-S,S'-di-2-bromobenzyl ethoxyphenylphosphinylimidodithiocarbonate was obtained.

O. Preparation of S,S'-1,2-Butylene-S,S'-di-2-Chloro-4-Iodobenzyl-Dimethoxyphosphinylimidodithiocarbonate Substituting butane-1,2-dithiol for ethanediol, dimethoxyphosphinyl isothiocyanate for diethoxyphosphinyl isothiocyanate, and 2-chloro-4-iodobenzyl chloride for benzyl bromide, the compound S,S'-1,2-butylene-S,S'-di-2-chloro-4-iodobenzyl-dimethoxyphosphinylimidodithiocarbonate was obtained.

P. Preparation of S,S'-2,3-Dimethyltetramethylene-S,S'-di-2-Methallyl-Diethoxyphosphinylimidodithiocarbonate Substituting 2,3-dimethylbutane-1,4-dithiol for ethanediol, and methallyl chloride for benzyl bromide, the compound S,S'-2,3-dimethyltetramethylene-S,S'-di-2-methallyldiethoxyphosphinylimidodithiocarbonate was obtained.

EXAMPLE 3

Preparation of S,S'-methylene-S,S'-Dimethyl-Diethoxyphosphinylimidodithiocarbonate To 9.6 parts of methyl diethoxyphosphinyldithiocarbamate and 4.0 parts of triethylamine in 32 parts by volume of benzene is added 5.4 parts of methylene iodide. The reaction mixture, after stirring overnight, is water-washed, and concentrated in vacuo. The oil, in methanol, stood several hours to remove the by-product, diethoxyphosphinyl isothiocyanate. The methanol is removed and the oil in benzene is rewashed. Removal of solvent leaves 8.6 parts of an oil which is further purified by column chromatography on silica gel. The product, recovered from the column with chloroform-methanol, is crystallized from ether at $-20°$ to $0°$ C. to give two crops of white crystals totaling 4.2 parts, melting point $33°$ to $34.5°$ C. and $32.5°$ to $33.5°$ C., respectively.

Analysis Calculated for $C_{13}H_{28}N_2O_6P_2S_4$: C, 31.32; H, 5.66; N, 5.62; P, 12.42; S, 25.73.

Found: C, 31.28; H, 5.66; N, 5.50; P, 12.30; S, 25.75.

The infrared spectrum shows maxima at $1,250$ cm$^{-1}$ and $1,550$ cm$^{-1}$ attributable to the P=O and C=N functions, respectively.

EXAMPLE 4

Preparation of Oxydimethylene-bis-Diethoxyphosphinyldithiocarbamate

To an ice-cooled mixture of 0.9 part of bis-chloromethyl ether in 10 parts (by volume) of dry acetone is added 2.0 parts of potassium diethoxyphosphoryldithiocarbamate. After thirty minutes, the bath is removed and the mixture is stirred overnight. Filtration followed by concentration in vacuo gives 1.6 parts of yellow solids. The solids crystallize at room temperature from about 3:1 hexane-chloroform as pale yellow crystals, melting point $98.6°$ to $99.6°$ C., 1.1 parts (58 percent).

Analysis Calculated for $C_{12}H_{26}N_2O_7P_2S_4$: C, 28.79; H, 5.24; N, 5.60; P, 12.38; S, 25.62.

Found: C, 28.61; H, 5.30; N, 5.75; P, 12.12; S, 25.63.

The infrared spectrum shows bands at $1,480$ cm$^{-1}$ and $3,050$ cm$^{-1}$ attributable to the

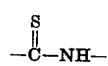

group and at $1,240$ cm$^{-1}$ for the P=O function.

Substituting potassium ethoxyphenylphosphoryldithiocarbamate for the potassium diethoxyphosphinyldithiocarbamate results in the formation of the compound oxydimethylene-bis-ethoxyphenylphosphinyldithiocarbamate.

EXAMPLE 5

Anthelmintic Activity

A. Single Active Ingredient

Testing was done in young mongrel dogs with natural or experimental infections of one or more of the following helminths: Hookworms — *Ancylostoma caninum, Uncinaria stenocephala*; Roundworms — *Toxocara canis, Toxascaris leonina*; Tapeworms — *Dipylidium caninum, Taenia pisiformis*. Dogs were determined to be infected by finding eggs in the feces in the case of the nematodes, and proglottids in the case of tapeworms.

Compounds were administered orally in gelatin capsules. Dogs were not starved prior to treatment.

After dogs were treated, all feces were collected and washed through 80-mesh screens. Material retained in the screen was examined for worms which were identified and counted. Dogs were necropsied after their feces had been negative for worms for 2 days. At necrospsy the worms remaining in the intestines were counted and the number remaining compared with those passed to find percent efficacy of the compound. Dogs with tapeworm infections were held for at least 2 weeks following treatment before necropsy.

D. canium scolices were either dissolved or so badly damaged by these compounds that they were not recovered from feces, although other pieces of the worms were found. Therefore it was not possible to know how many worms were passed by treated dogs. Most passed T. pisiformis scolices showed some damage such as some or all hooks missing or rostellum missing.

In the Table, all dogs given the same dose are combined with the number of worms passed and retained listed being the total for all dogs at that dose. Dividing the number of worms passed plus number retained by the number of dogs would give the average worm burden per dog.

EXAMPLE 6

B. Combination of Active Ingredients

Tests were done in infected dogs with mixed parasitic populations of Ascaris, Hookworm, Whipworm and Tapeworm. The dogs were separated into groups based on fecal egg counts. The anthelmintics were given orally in the feed either separately or in combination. Stools from the treated animals were examined daily after treatment for the elimination of parasites. After 2 days or negative screening the dogs were necropsied and their remaining worm burdens calculated.

Data obtained are reported in the table below.

TABLE I

| Compound name | Single oral dose, mg./kg. | No. of dogs | A. caninum | | | U. stenocephals | | | T. canis | | | T. leonina | | | D. caninum | | | T. pisiformis | | |
|---|---|---|---|---|---|---|---|---|---|---|---|---|---|---|---|---|---|---|---|---|
| | | | Worms Passed | Worms Retained | Percent efficacy | Worms Passed | Worms Retained | Percent efficacy | Worms Passed | Worms Retained | Percent efficacy | Worms Passed | Worms Retained | Percent efficacy | Worms Passed | Worms Retained | Percent efficacy | Worms Passed | Worms Retained | Percent efficacy |
| Imidocarbonic acid, (diethoxy-phosphinyl)-dithio-, S,S'-dimethyl S,S'-methylene ester | 10<br>5<br>2.5 | 1<br>1<br>3 | (a)<br>23<br>192 | 0<br>1<br>122 | 100<br>96<br>61 | | | | | 0 | | | 10 | 91 | | 1 | | | | 0 | 100 (1) |
| Imidocarbonic acid, (diethoxy-phosphinyl)-dithio-, S,S'-dibenzyl S,S'-ethylene ester | 15<br>5<br>2.5<br>1.25 | 1<br>2<br>5<br>1 | 12<br>64<br>82 | 0<br>0<br>85 | 100<br>100 (1)<br>49 (4)<br>61 | | | | 1<br>0 | 0<br>3 | —b(1)<br>0 (1) | 8<br>5<br>26<br>0 | 0<br>0<br>18<br>1 | 100<br>100 (1)<br>59 (4) | | ≥2 | 0 100 (1) | 4<br>3<br>0 | 0<br>0<br>4 | 100 (1)<br>100 (2)<br>0 |
| Imidocarbonic acid, (di-propoxyphosphinyl)-dithio-, S,S'-dibenzyl S,S'-ethylene ester | 5<br>2.5 | 1<br>1 | 36 | 33 | 52 | 4 | 52 | 7 | | | | 1<br>3 | 0<br>6 | 33 | | | | 2 | 1 | 67 |
| Imidocarbonic acid, (di-ethoxyphosphinyl)-dithio-, S,S'-dibenzyl S,S'-tri-methylene ester | 5<br>4<br>2.5<br>2<br>1.25<br>0.75 | 1<br>2<br>1<br>6<br>3<br>1 | 78<br>21<br>8<br>51<br>25<br>13 | 0<br>2<br>0<br>48<br>84<br>5 | 100<br>91 (1)<br>100<br>52 (2)<br>23 (3)<br>72 | 59 | 1 | 98 (2) | 0<br>0<br>6<br>2 | 7<br>22<br>0<br>5 | 0 (1)<br>—(1)<br>100 (2)<br>0 | 33<br>11<br>2<br>51<br>21<br>0 | 3<br>6<br>0<br>77<br>2<br>3 | 92<br>65<br>100<br>40<br>91 (2)<br>0 | ≥1<br>≥1<br>≥1 | 0 100 (1)<br>0 100 (1)<br>0 100 (1) | 0<br>0<br>10<br>1 | 100<br>68 (2)<br>50 (1) |
| Imidocarbonic acid, (diethoxy-phosphinyl)-dithio-, S,S'-bis(p-chlorobenzyl) S,S'-ethylene ester | 5 | 1 | | | | | | | | | | 0 | 1 | | | | | 2 | 2 | 50 |
| Imidocarbonic acid, (diiso-propoxyphosphinyl)-dithio-, S,S'-dibenzyl S,S'-ethylene ester | 2.5 | 1 | 2 | 25 | 7 | 4 | 6 | 40 (1) | 3 | 0 | 100 | 6 | 7 | 46 | ≥1 | 0 | 100 | 2 | 0 | 100 |
| Imidocarbonic acid, (diethoxy-phosphinyl)-dithio-, S,S'-dibenzyl S,S'-tetramethylene ester | 2 | 2 | 60 | 23 | 72 (1) | | | | | | | 5 | 16 | 24 | | | | | | |
| Imidocarbonic acid, (di-propoxyphosphinyl)-dithio-, S,S'-dibenzyl S,S'-tri-methylene ester | 7.5<br>2 | 1<br>2 | 4<br>8 | 142<br>74 | 3<br>98 | | | | | | | 2<br>1 | 42<br>25 | 5<br>4 | | | | 14 | 1 | 93 | a Not critical test—number of worms passed not known.
b ( )—number of dogs if not same as fourth column.

Table II

Percent Efficiency of M-Amino Tetramisole/Imidocarbonic Acid, (Diethoxyphosphinyl)dithio S,S'-dibenzyl-S,S'-trimethylene Ester.

| Dose mg/kg | No. of Dogs | Ascaris | Hookworm | Whipworm | tapeworm |
|---|---|---|---|---|---|
| 2.5/0* | 3 | 78 | 100 | 89 | 0 |
| 0/2.5 | 2 | (1) 100 | (4) 77 | 0 | 100 |
| 2/2 | 26 | 82 | 98 | 92 | 75 |
| 2/2 BID | 4 | 81 | 100 | 100 | 100 |
| 3/3 | 5 | 88 | 98 | 96 | 100 |
| 2/4 | 2 | 82 | 99 | 84 | 100 |

*M-Amino Tetramisole/Imidocarbonic acid, (diethoxyphosphinyl) dithio,S,S'-dibenzyl-S,S'-trimethylene ester.
( ) Number of dogs where different than cited.

I claim:

1. A method for the control of helminths in warm-blooded animals comprising, administering to said host animals an anthelmintically effective amount of a compound having the formula:

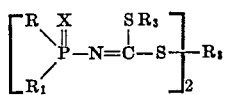

wherein R and $R_1$ each represent a member selected from the group consisting of loweralkyl $C_1$-$C_4$, loweralkoxy $C_1$-$C_4$ and phenyl; X is sulfur or oxygen; $R_2$ is a member selected from the group consisting of loweralkyl $C_1$-$C_4$, loweralkenyl $C_1$-$C_4$, benzyl and halo-substituted benzyl; and $R_3$ is loweralkylene $C_1$-$C_4$.

2. A method according to claim 1 wherein R and $R_1$ each loweralkoxy $C_1$-$C_4$.

3. A method according to claim 1 wherein said compound is administered as a single dose of from 2.5 mg. to 30 mg. per kg. of animal body weight.

4. A method according to claim 2 wherein said compound is administered as a single oral dose to the host animal at from 2.5 mg. to 15 mg./kg. of animal body weight.

5. A method according to claim 1 wherein the compound is S,S'-ethylene S,S'-dibenzyl(diethoxyphosphinyl)-imidodithiocarbonate and is administered as a single oral dose to the host animal at from 2.5 mg. to 15 mg./kg. of animal body weight.

6. A method according to claim 1 wherein the compound is S,S'-methylene S,S'-dimethyl diethoxyphosphinylimidodithiocarbonate and is administered as a single oral dose to the host animal at from 2.5 mg. to 15 mg. per kg. of animal body weight.

7. A method according to claim 1 wherein the compound is S,S'-trimethylene S,S'-dibenzl(diethoxyphosphinyl)-imidodithiocarbonate and is administered at from 2.5 mg. to 15 mg. per kg. of animal body weight.

8. A method according to claim 1 wherein said compound is administered at from 0.001 to 1.0 percent in the animal feed.

9. An animal feed composition comprising a nutritionally balanced feed and from about 0.001 to 1.0 percent by weight of a compound of the formula:

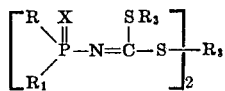

wherein R and $R_1$ each represent loweralkyl $C_1$-$C_4$, loweralkoxy $C_1$-$C_4$ or phenyl; X is sulfur or oxygen; $R_2$ is loweralkyl $C_1$-$C_4$, loweralkenyl $C_1$-$C_4$, benzyl or halobenzyl; and $R_3$ is loweralkyl $C_1$-$C_4$.

10. A composition according to claim 9 wherein R and $R_1$ are each loweralkoxy $C_1$-$C_4$.

* * * * *

UNITED STATES PATENT OFFICE
CERTIFICATE OF CORRECTION

Patent No. 3,691,283            Dated September 12, 1972

Inventor(s)        Mary Ehlers Doscher

It is certified that error appears in the above-identified patent and that said Letters Patent are hereby corrected as shown below:

Column 1, first formula, that portion of the formula reading $$\begin{array}{c} SR_3 \\ | \\ =C-S- \end{array} \quad \underline{\text{should read}} \quad \begin{array}{c} SR_2 \\ | \\ =C-S- \end{array}$$

Column 13, Claim 1, in the formula, that portion of the formula reading $$\begin{array}{c} SR_3 \\ | \\ =C-S- \end{array} \quad \underline{\text{should read}} \quad \begin{array}{c} SR_2 \\ | \\ =C-S- \end{array}$$

Column 14, Claim 9, in the formula, that portion of the formula reading $$\begin{array}{c} SR_3 \\ | \\ =C-S- \end{array} \quad \underline{\text{should read}} \quad \begin{array}{c} SR_2 \\ | \\ =C-S- \end{array}$$

Signed and sealed this 20th day of February 1973.

(SEAL)
Attest:

EDWARD M. FLETCHER, JR.　　　　　ROBERT GOTTSCHALK
Attesting Officer　　　　　　　　　Commissioner of Patents